US011399550B2

(12) United States Patent
Blaine

(10) Patent No.: US 11,399,550 B2
(45) Date of Patent: *Aug. 2, 2022

(54) PORK BELLY TRIMMING

(71) Applicant: John Bean Technologies Corporation, Chicago, IL (US)

(72) Inventor: George R. Blaine, Lake Stevens, WA (US)

(73) Assignee: John Bean Technologies Corporation, Chicago, IL (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/117,656

(22) Filed: Dec. 10, 2020

(65) Prior Publication Data

US 2021/0092968 A1    Apr. 1, 2021

Related U.S. Application Data

(63) Continuation of application No. 16/552,858, filed on Aug. 27, 2019, now Pat. No. 10,863,751.
(Continued)

(51) Int. Cl.
*A22C 17/00* (2006.01)
*A22C 17/02* (2006.01)
*G06T 7/00* (2017.01)

(52) U.S. Cl.
CPC .......... *A22C 17/0006* (2013.01); *A22C 17/02* (2013.01); *G06T 7/0006* (2013.01);
(Continued)

(58) Field of Classification Search
CPC ....... A22C 17/00; A22C 17/02; A22C 17/006; A22C 17/002; A22B 5/0064; A22B 5/007; A22B 7/007; A22B 7/00
(Continued)

(56) References Cited

U.S. PATENT DOCUMENTS 4,875,254 A * 10/1989 Rudy .................... B23Q 17/24
83/365
5,324,228 A * 6/1994 Vogeley, Jr. ....... A22C 17/0086
452/158
(Continued)

FOREIGN PATENT DOCUMENTS

EP          1 174 034 A1    1/2002

OTHER PUBLICATIONS

International Search Report and Written Opinion dated Dec. 13, 2019, issued in corresponding International Patent Application No. PCT/US2019/048248, filed Aug. 27, 2019, 19 pages.

*Primary Examiner* — Richard T Price, Jr.
(74) *Attorney, Agent, or Firm* — Christensen O'Connor Johnson Kindness PLLC

(57) ABSTRACT

A system 10 for analyzing and trimming pork bellies and other three-dimensional food and non-food products which are to be subsequently portioned or sliced so as to achieve an optimum harvest of slices from the food product bearing in mind achieving a maximum yield together with a desired quality level of the portions/slices. The system 10 includes a conveyor 12 for carrying the workpieces (WP) to be trimmed prior to subsequent slicing of the workpiece past a scanning system 14 for scanning the workpiece WP to ascertain the physical characteristics of the workpiece, including, for example, its three-dimensional shape as well as its position on the conveyor.
A cutting station 16 trims the workpiece WP into a desired two-dimensional shape which represents an optimum shape for the workpiece that seeks to maximize the harvest of slices from the workpiece while maintaining a desired quality level for the slices. A slicing station uses high speed cutters or slicers for portioning/slicing the workpiece into
(Continued)

portions/slices which have been simulated by a processing system 18 employing a processor or computer 20.

19 Claims, 6 Drawing Sheets

Related U.S. Application Data

(60) Provisional application No. 62/723,812, filed on Aug. 28, 2018.

(52) U.S. Cl.
CPC .............. *G06T 2207/30128* (2013.01); *G06T 2207/30164* (2013.01)

(58) Field of Classification Search
USPC .......................... 119/198, 174, 149–159, 136
See application file for complete search history.

(56) References Cited

U.S. PATENT DOCUMENTS

| | | |
|---|---|---|
| 5,365,186 A | 11/1994 | Ensley |
| 5,585,603 A | 12/1996 | Vogeley, Jr. |
| 5,868,056 A | 2/1999 | Pfarr et al. |
| 7,153,703 B2 | 12/2006 | Peng et al. |
| 7,251,537 B1 | 7/2007 | Blaine et al. |
| 7,452,266 B2 | 11/2008 | Bottemiller |
| 7,841,264 B2 | 11/2010 | Kim et al. |
| 7,949,414 B2 | 5/2011 | Blaine et al. |
| 8,688,267 B2 | 4/2014 | Blaine et al. |
| 9,000,893 B2 | 4/2015 | Kwak |
| 9,128,810 B1 | 9/2015 | Blaine et al. |
| 2018/0029246 A1 | 2/2018 | Blaine et al. |

\* cited by examiner

PORK BELLY TRIMMING

CROSS-REFERENCES TO RELATED APPLICATIONS

This application is a continuation of U.S. patent application Ser. No. 16/552,858, filed Aug. 27, 2019 (now U.S. patent Ser. No. 10/863,751), which claims the benefit of U.S. Provisional Application No. 62/723,812, filed Aug. 28, 2018, the disclosures of both of which applications are incorporated by reference herein in their entirety.

BACKGROUND

Slaughterhouses portion hog carcasses into two similar halves by cutting down the middle of the backbone, see FIGS. 1 and 2. The hog halves are then further portioned into primal cuts including the front and rear hocks, fat back, loin, belly, shoulder, ham, and jowl. The ham and shoulder cuts are generally removed before sectioning the midsection of the hog. The midsection contains the fat back, loin, ribs and belly. The pork belly is the cut of meat taken from the hog half midsection after removal of the loin, fat back and ribs. Pork bellies are trimmed of fat and defects into a generally rectangular shape. The pork belly may vary in thickness about its area and have contours or concaves in its outer surface. Moreover, the pork belly is characterized by a notch at one end of the belly. The notch is caused by/results from removal of the ham and/or the loin from the hog half. As such, the exact location, configuration and size of the notch can vary significantly from hog to hog. Pork bellies are cut into bacon slices, but before doing so the pork belly must be trimmed into a rectangular shape before being fed into a high speed slicer. The slicer cuts across the belly to form the bacon slices.

To maximize yield, it is desirable to use as much of the pork belly as possible when cutting into bacon slices. However, it is also desirable that the bacon slices are of sufficient quality, as defined by various desirable attributes or characteristics of the bacon slices. Many of these attributes or characteristics are based on the fact that there is significant variation of the anatomy from one pork belly to another. Some of the attributes or characteristics of bacon slices include the thickness of the bacon slice, the length of the bacon slice, the height range of the bacon slice along its length, the heights of the ends of the bacon slice, the minimum height along the length of the bacon slice, the flatness of the top surface of the bacon slice, the extent of depressions or concavities in the top surface of the bacon slice, the depth of the concavity, as well as the area of the concavity, the total area of the bacon slice, as well as other attributes and characteristics.

Since pork bellies are currently typically trimmed into rectangular shapes by slicing manually, it is not possible to monitor or take into consideration all or very many of the desired attributes of the sliced bacon. As a result, often the pork belly is trimmed into a "conservative" rectangular shape, for example, by staying a significant distance away from the notch, thereby trimming away acceptable portions of the pork belly. On the other hand of the spectrum, the pork belly may be trimmed to include unacceptable portions of the pork belly, for example the notch area, so that the resulting bacon slices are below grade. As such, it is desirable to have a system and method for trimming pork bellies into rectangular shapes for slicing wherein as many of the attributes of the sliced bacon as desired may be taken into consideration. The present disclosure seeks to provide a system and method that addresses the foregoing need.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for trimming a three-dimensional workpiece to optimize dividing the trimmed workpieces into multiple final pieces based on designated physical characteristics of the final pieces includes:

designating a plurality of physical characteristics for the final pieces;

scanning the workpiece to obtain electronic data regarding the physical characteristics of the workpiece;

generating a three-dimensional model of the scanned workpiece;

mapping an initial two-dimensional area on the workpiece to select a portion of the workpiece to be harvested from the workpiece based on the generated three-dimensional model of the workpiece;

simulating the dividing of the workpiece corresponding to the mapped two-dimensional area of the workpiece into final pieces;

determining for the simulated final pieces the variance from the designated physical characteristics of the final pieces;

rating the overall selected portion of the workpiece to be harvested based on the extent to which each simulated final pieces possess the designated physical characteristics of the final pieces;

if the rating of the selected portion of the workpiece to be harvested is within a predetermined set point, trimming the workpiece into the mapped two-dimensional area.

In the method, the two-dimensional area is mapped on the top surface of the scanned workpiece.

In the method, the two-dimensional area is adjusted to the shape of the workpiece when viewed from the top of the workpiece.

In the method, the one or more of the length, width and angulation about a vertical axis of the two-dimensional area is mapped on the workpiece based on the shape of the workpiece when viewed from the top of the workpiece.

In the method, the workpiece is a pork belly

In the method, the two-dimensional area of the workpiece is rectangular in shape.

The method further includes determining for each of the simulated final pieces the variance from the designated physical characteristics of the final pieces.

The method includes determining for the simulated final pieces the variance from each of the designated physical characteristics of the final pieces.

In the method, the selected portion of the workpiece to be harvested from the workpiece corresponding to the mapped two-dimensional area on the workpiece is rated according to an optimization function as applied to the designated physical characteristics of the final pieces to be divided from the selected portion of the final piece.

In the method, the rating of the selected portion of the workpiece to be harvested from the workpiece is based on the deviation of one or more of the designated physical characteristics of the final piece from an ideal physical characteristic value or level.

In the method, a rating factor is applied to one or more of the designated physical characteristics.

In the method, the rating factor is automatically adjusted based on one or more algorithms to maximize the optimization rating of the one or more designated physical characteristics.

In the method, a plurality of optimization functions are applied to one or more of the designated physical characteristics of the final pieces.

In the method, the plurality of optimization functions can be simultaneously applied to one or more of the designated physical characteristics.

In the method, the designated physical characteristics can include one or more of: the thickness of the simulated final piece; the length of the simulated final piece; the height range of the simulated final piece; the heights at the ends of the simulated final piece; the height range along the length of the simulated final piece; the minimum height along the length of the simulated final piece; the flatness of the top and/or bottom surface of the simulated final piece; the extent of concavity of the top and/or bottom surface of the simulated final piece; the area of the concavity of the top and/or bottom surface of the final piece; the depth of the concavity of the top and/or surface of the final piece; the aspect ratio of the concavity of the top and/or bottom surface of the simulated final piece; the taper of the height of the simulated final piece along the length of the simulated final piece; the roughness of the top and/or bottom surface of the simulated final piece; the area of the simulated final piece defined by the length and height of the simulated final piece; the range of taper of the simulated final piece; the area of the mapped two-dimensional area on the workpiece relative to the total two-dimensional area of the workpiece.

In the method, a weighted value is applied to one or more of the designated physical characteristics is carried out through the use of a user interface.

In the method, the user interface enables entry or alteration of one or more designated physical characteristics.

In the method, the rating of the selected portion of the workpiece to be harvested from the workpiece may be carried out according to:

(a) a cost function applied to one or more of the designated physical characteristics with a cost applied to the one or more designated physical characteristics increasing as the one or more designated physical characteristics deviates from an ideal characteristic value or level; or (b) a value function is applied to one or more of the designated physical characteristics, with a value applied to the one or more designated physical characteristics decreasing as the one or more designated physical characteristic deviates from an ideal characteristic value or level.

In the method, a weighting factor is applied to the one or more designated physical characteristics.

In the method, the weighting factor is automatically adjusted based on one or more selected algorithms to minimize a cost function or maximize a value function of the one or more designated physical characteristics.

The method may include applying a plurality of optimization functions are applied to the one or more designated physical characteristics.

The method may include simultaneously applying the plurality of optimization functions are simultaneously applied to one or more of the designated physical characteristics.

A method for trimming pork bellies into a rectangular shape prior to the slicing of the pork bellies includes:

designating a plurality of desired physical attributes for the pork belly slices;

scanning the pork belly to obtain electronic data regarding the physical attributes of the pork belly;

generating a three-dimensional model of the scanned pork belly;

mapping an initial two-dimensional area and location on the top surface of the pork belly to designate a portion of the pork belly to be sliced based on the generated three-dimensional model of the pork belly;

simulating the cutting of the pork belly into individual slices;

determining for the simulated individual slices, the variance from the desired physical attributes;

rating the overall selected portion of the pork belly corresponding to the mapped two-dimensional area and location based on the extent to which the simulated slices possesses (varies from) the designated desired physical attributes of the slices; and iteratively mapping a further two-dimensional area of the pork belly and location to select another portion of the pork belly to be sliced, simulating the slicing of the pork belly from the selected two-dimensional area and location, determining for the simulated slices the variance from the desired physical attributes of the slices and rating the overall selected portion of the pork belly corresponding to the mapped two-dimensional area and location based on the extent to which of the simulated slices possesses the desired physical attributes of the slices, until an optimum two-dimensional area and location of the workpiece is selected; and trimming the pork belly into the selected optimum two-dimensional area and location of the pork belly.

The method further including determining for each of the simulated individual slices the variance from the designated physical attributes.

The method further including determining for the simulated slices the variance from each of the desired physical attributes.

A system for trimming a three-dimensional workpiece while being conveyed on a conveyor system to optimize dividing the trimmed workpieces into multiple final pieces based on designated physical characteristics of the final pieces, including:

a conveyance system having a transport surface for transporting a stream of separated workpieces in a transport direction;

a scanner apparatus for scanning the workpiece to obtain electronic data regarding the physical characteristics of the workpiece;

a control system:

generating a three-dimensional model of the scanned workpiece from the electronic scanner data;

mapping an initial two-dimensional area on the workpiece to select a portion of the workpiece to be harvested from the workpiece based on the generated three-dimensional model of the workpiece;

simulating the dividing of the workpiece corresponding to the mapped two-dimensional area of the workpiece into final pieces;

determining for the simulated final pieces the variance from the designated physical characteristics of the final pieces;

rating the overall selected portion of the workpiece to be harvested based on the extent to which the simulated final pieces possess the designated physical characteristics of the final pieces;

cutter for trimming the workpiece into the mapped two-dimensional area if the rating of the selected portion of the workpiece to be harvested is within a predetermined set point.

The system wherein the workpiece is a pork belly

The system wherein the control system maps the two-dimensional area onto the top surface of the scanned workpiece.

The system wherein the control system adjusts the two-dimensional area to the shape of the workpiece when viewed from the top of the workpiece.

The system wherein the control system maps the one or more of the length, width and angulation about a vertical axis of the two-dimensional area on the workpiece based on the shape of the workpiece when viewed from the top of the workpiece.

The system wherein the two-dimensional area mapped on the workpiece by the control system is rectangular in shape.

The system further including rating the overall selected portion of the workpiece to be harvested based on the extent to which the simulated final piece possess the designated physical characteristics of the final pieces.

The system wherein the control system for the simulated final pieces determines the variance from designated physical characteristics including any one or more of the thickness of the simulated final piece; the length of the simulated final piece; the height range of the simulated final piece; the heights at the ends of the simulated final piece; the height range along the length of the simulated final piece; the minimum height along the length of the simulated final piece; the flatness of the top and/or bottom surface of the simulated final piece; the extent of concavity of the top and/or bottom surface of the simulated final piece; the area of the concavity of the top and/or bottom surface of the final piece; the depth of the concavity of the top and/or bottom surface of the final piece; the aspect ratio of the concavity of the top and/or bottom surface of the simulated final piece; the taper of the height of the simulated final piece along the length simulated final piece; the roughness of the top and/or bottom surface of the simulated final piece; the area of the simulated final piece defined by the length and height of the simulated final piece; the range of taper of the simulated final piece; the area of the mapped two-dimensional area on the workpiece relative to the total two-dimensional area of the workpiece.

The system wherein the control system rates the overall selected portion of the workpiece to be harvested according to an optimization function as applied to the designated physical characteristics of the final pieces to be divided from the selected portion of the final piece.

The system wherein the control system rates the selected portion of the workpiece to be harvested from the workpiece based on the deviation of one or more of the designated physical characteristics of the final piece from an ideal physical characteristic value or level.

The system wherein the control system applies a rating factor to one or more of the designated physical characteristics.

The system wherein the control system automatically adjusts the rating factor based on one or more algorithms to maximize the optimization rating of the one or more designated physical characteristics.

The system wherein the control system applies a plurality of optimization functions to one or more of the designated physical characteristics of the final pieces.

The system wherein the control system applies the plurality of optimization functions to one or more of the designated physical characteristics.

The system further including a user interface to apply the weighted value to one or more of the designated physical characteristics.

The system wherein the user interface enables entry or alteration of one or more designated physical characteristics.

The system wherein the control system rates the selected portion of the workpiece to be harvested from the workpiece according to one of:

(a) a cost function applied to one or more of the designated physical characteristics with a cost applied to the one or more designated physical characteristics increasing as the one or more designated physical characteristics deviates from an ideal characteristic value or level; and (b) a value function is applied to one or more of the designated physical characteristics, with a value applied to the one or more designated physical characteristics decreasing as the one or more designated physical characteristic deviates from an ideal characteristic value or level.

The system wherein the control system applies a weighting factor to the one or more designated physical characteristics.

The system wherein the control system automatically adjusts the weighting factor based on one or more selected algorithms to minimize a cost function or maximize a value function of the one or more designated physical characteristics.

The system wherein the control system iteratively maps two-dimensional areas and locations of the pork belly to be sliced, simulates the slicing of the pork belly from the selected two-dimensional area and location, determines for each of the simulated slices the variance from the desired physical attributes of the slices and rates the overall selected portion of the pork belly corresponding to the mapped two-dimensional area and location based on the extent to which of the simulated slices possesses the desired physical attributes of the slices, until an optimum two-dimensional area and location of the workpiece is obtained.

A non-transitory computer-readable medium including computer-executable instructions which, when loaded onto a computer, perform a method, comprising:

designating a plurality of physical characteristics for final pieces to be divided from a workpiece after the workpiece has been trimmed to optimize the designated physical characteristics exhibited by the final pieces divided from the workpiece;

controlling a scanner for scanning the workpiece to obtain data regarding the physical characteristics of the workpiece;

generating a three-dimensional model of the data regarding the scanned workpiece;

mapping an initial two-dimensional area on the workpiece to select a portion of the workpiece to be harvested from the workpiece based on the generated three-dimensional model of the workpiece;

simulating the dividing of the workpiece corresponding to the mapped two-dimensional area of the workpiece into final pieces;

determining for the simulated final pieces the variance from the designated physical characteristics of the final pieces;

rating the overall selected portion of the workpiece to be harvested based on the extent to which the simulated final pieces possess the designated physical characteristics of the final pieces;

if the rating of the selected portion of the workpiece to be harvested is within a predetermined set point, controlling a cutter for trimming the workpiece into the mapped two-dimensional area.

The non-transitory computer-readable medium wherein the workpiece is a pork belly.

The non-transitory computer-readable medium wherein the two-dimensional area is mapped on the top surface of the scanned workpiece.

The non-transitory computer-readable medium wherein the two-dimensional area is adjusted to the shape of the workpiece when viewed from the top of the workpiece.

The non-transitory computer-readable medium wherein the one or more of the length, width and angulation about a vertical axis of the two-dimensional area is mapped on the workpiece based on the shape of the workpiece when viewed from the top of the workpiece.

The non-transitory computer-readable medium wherein the two-dimensional area of the workpiece is rectangular in shape.

The non-transitory computer-readable medium further comprising rating the overall selected portion of the workpiece to be harvested based on the extent to which each simulated final piece possesses the designated physical characteristics of the final pieces.

The non-transitory computer-readable medium wherein the designated physical characteristics include any one or more of the thickness of the simulated final piece; the length of the simulated final piece; the height range of the simulated final piece; the heights at the ends of the simulated final piece; the height range along the length of the simulated final piece; the minimum height along the length of the simulated final piece; the flatness of the top and/or bottom surface of the simulated final piece; the extent of concavity of the top and/or bottom surface of the simulated final piece; the area of the concavity of the top and/or bottom surface of the final piece; the depth of the concavity of the top and/or bottom surface of the final piece; the aspect ratio of the concavity of the top and/or bottom surface of the simulated final piece; the taper of the height of the simulated final piece along the length simulated final piece; the roughness of the top and/or bottom surface of the simulated final piece; the area of the simulated final piece defined by the length and height of the simulated final piece; the range of taper of the simulated final piece; the area of the mapped two-dimensional area on the workpiece relative to the total two-dimensional area of the workpiece.

The non-transitory computer-readable medium wherein the selected portion of the workpiece to be harvested from the workpiece corresponding to the mapped two-dimensional area on the workpiece is rated according to an optimization function as applied to the designated physical characteristics of the final pieces to be divided from the selected portion of the final piece.

The non-transitory computer-readable medium wherein the rating of the selected portion of the workpiece to be harvested from the workpiece is based on the deviation of one or more of the designated physical characteristics of the final piece from an ideal physical characteristic value or level.

The non-transitory computer-readable medium wherein a rating factor is applied to one or more of the designated physical characteristics.

The non-transitory computer-readable medium wherein the rating factor is automatically adjusted based on one or more algorithms to maximize the optimization rating of the one or more designated physical characteristics.

The non-transitory computer-readable medium wherein one or more optimization functions are applied to one or more of the designated physical characteristics of the final pieces.

The non-transitory computer-readable medium wherein the one or more optimization functions are simultaneously applied to one or more of the designated physical characteristics.

The non-transitory computer-readable medium wherein the application of the weighted value to one or more of the designated physical characteristics is carried out through the use of a user interface.

The non-transitory computer-readable medium wherein the one or more designated physical characteristics may be designated with a user interface.

The non-transitory computer-readable medium wherein the rating of the selected portion of the workpiece to be harvested from the workpiece is carried out according to:

(a) a cost function applied to one or more of the designated physical characteristics with a cost applied to the one or more designated physical characteristics increasing as the one or more designated physical characteristics deviates from an ideal characteristic value or level; or (b) a value function is applied to one or more of the designated physical characteristics, with a value applied to the one or more designated physical characteristics decreasing as the one or more designated physical characteristic deviates from an ideal characteristic value or level.

The non-transitory computer-readable medium wherein the weighting factor is automatically adjusted based on one or more selected algorithms to minimize a cost function or maximize a value function of the one or more designated physical characteristics.

The non-transitory computer-readable medium wherein a plurality of optimization functions are applied to the one or more designated physical characteristics.

The non-transitory computer-readable medium wherein the plurality of optimization functions are simultaneously applied to one or more of the designated physical characteristics.

The non-transitory computer-readable medium iteratively mapping a further two-dimensional area of the pork belly and location to select another portion of the pork belly to be sliced, simulating the slicing of the pork belly from the selected two-dimensional area and location, determining for each of the simulated slices the variance from the desired physical attributes of the slices and rating the overall selected portion of the pork belly corresponding to the mapped two-dimensional area and location based on the extent to which of the simulated slices possesses the desired physical attributes of the slices, until an optimum two-dimensional area and location of the workpiece is selected.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
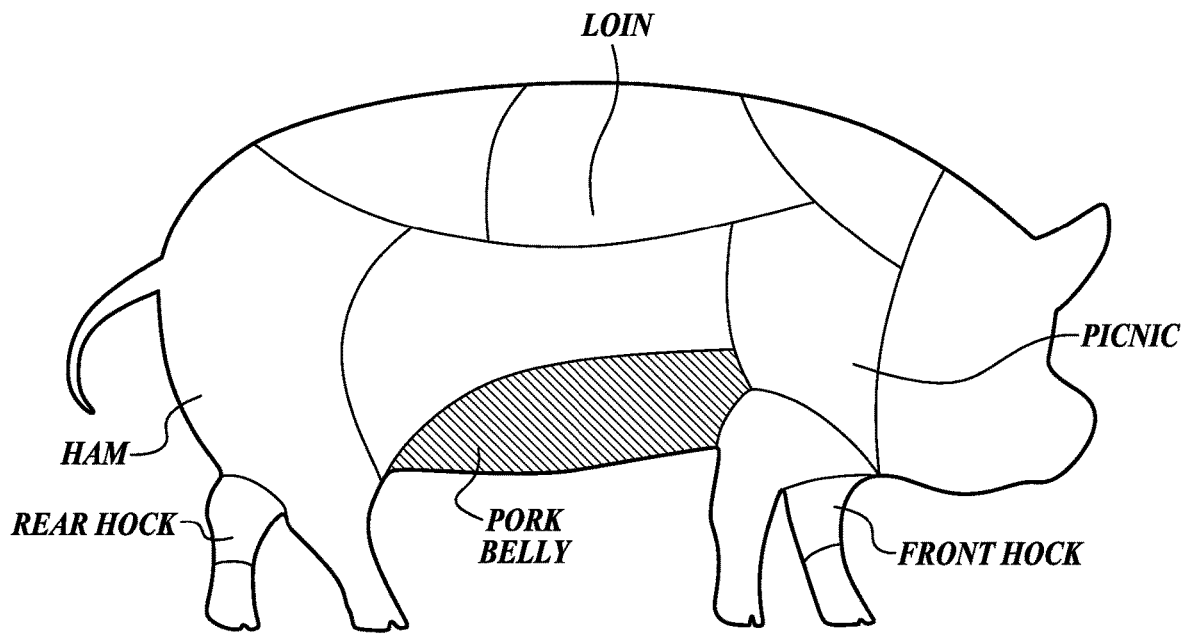
FIG. 1 is a schematic view of a hog wherein the location of the pork belly is indicated.
Figure 2:
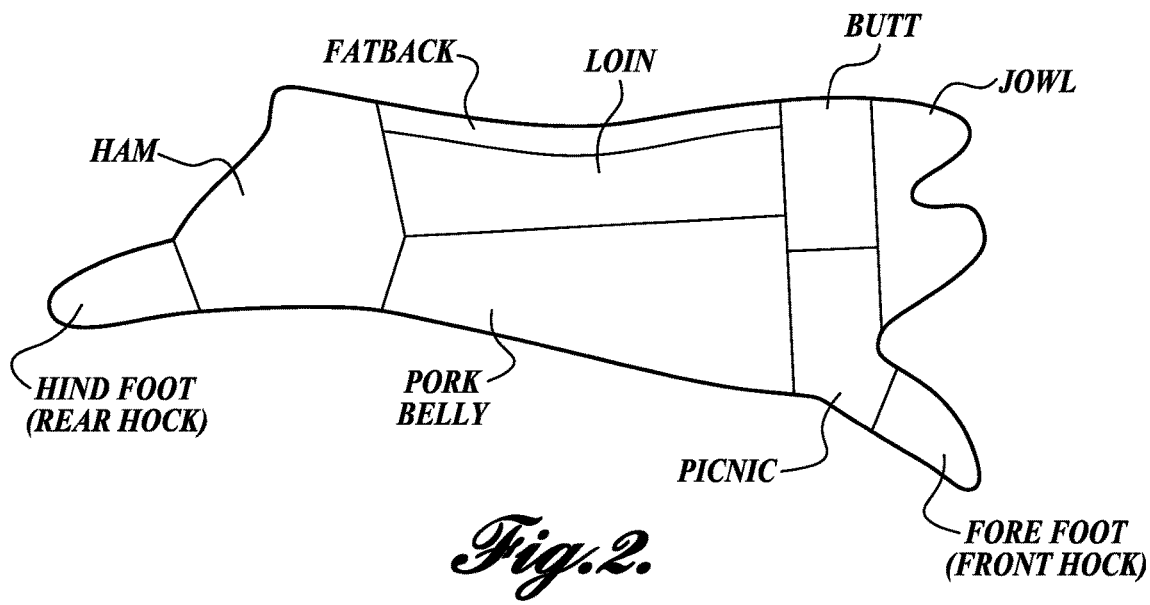
FIG. 2 is a schematic view of a hog carcass showing the primal cuts of meat.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "work product or "workpiece" synonymously. One example of a work product or workpiece described in the present application is a pork belly. However, the present invention can apply other foods as well as to work products/workpieces that are not food items.

In the following description and in the accompanying drawings, corresponding systems, assemblies, apparatus and units may be identified by the same part number, but with an alpha suffix. The descriptions of the parts/components of such systems assemblies, apparatus, and units that are the same or similar are not repeated so as to avoid redundancy in the present application.

Figure 3:
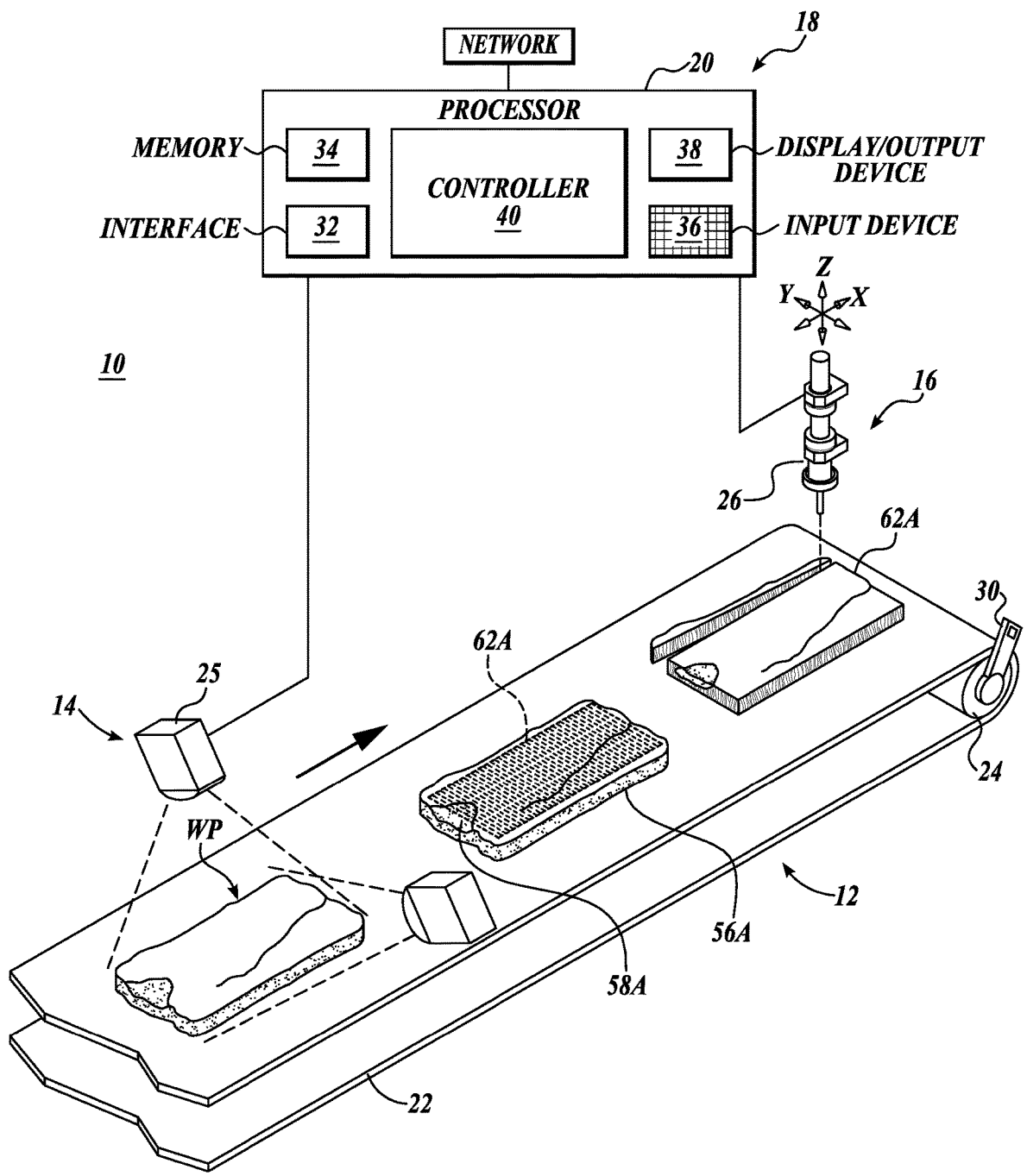
FIG. 3 is a schematic view of a disclosed workpiece trimming system.

FIG. 3 schematically illustrates an embodiment of the present disclosure consisting of a system 10 for analyzing and trimming pork bellies and other three-dimensional food and non-food products which are to be subsequently portioned or sliced so as to achieve an optimum harvest of slices from the food product bearing in mind achieving a maximum yield together with a desired quality level of the portions/slices. The system 10 includes a conveyor 12 for carrying the workpieces (WP) to be trimmed prior to subsequent slicing of the workpiece. Although a singular conveyor 12 is shown, multiple conveyors can be used with the system 10 or the conveyors can be a sufficient width so that multiple lanes of workpieces are carried by the conveyor.

The system 10 also includes a scanning system 14 for scanning the workpiece WP to ascertain the physical characteristics of the workpiece, including, for example, its three-dimensional shape as well as its position on the conveyor.

The system 10 further includes a cutting station 16 for trimming the workpiece WP into a desired two-dimensional shape which represents an optimum shape for the workpiece that seeks to maximize the harvest of slices from the workpiece while maintaining a desired quality level for the slices. After trimming the workpiece at cutting station 16, the workpiece is transferred to a slicing station utilizing high speed cutters or slicers for portioning/slicing the workpiece into portions/slices which have been simulated by a processing system 18 employing a processor or computer 20.

The scanning system 14 scans the workpiece WP to produce electronic scanning data representative of physical characteristics the workpiece and forwards the electronic scanning data to the processor 20. The processor analyzes the electronic scanning data to determine the physical characteristics and parameters of the workpiece pertaining, for example, to the size, shape and other physical aspects of the workpiece. Such characteristics and parameters may include, for example, the length, width, aspect ratio, thickness, thickness profile, surface contours, outer contour configurations, perimeter, outer perimeter configuration, outer perimeter size and shape, volume and/or weight, as well as whether the workpiece contains any undesirable materials, such as bones, fat, cartilage, metal, glass, plastic, etc., and the location of the undesirable materials in the workpiece.

Using the determined physical characterization of the workpiece, once the workpiece has been physically characterized, an optimization process can be carried out by use of the processor 20 to trim the workpiece into an desirable overall shape, such as a rectangular for a pork belly, so as to achieve an optimum harvest of final pieces or slices cut from the workpiece, bearing in mind a desire to maximize the value of the harvested workpiece in terms of maximizing the harvest quantity while maintaining a desired quality level of the final pieces or slices. In this regard, designated physical characteristics of the final pieces or slices harvested from the workpiece are identified.

The processor 20 is utilized to map an initial two-dimensional area on the workpiece which thereby defines the portion of the workpiece to be harvested. This initial two-dimensional area selection can be based on the generated three-dimensional model of the workpiece. The processor simulates dividing or cutting the workpiece corresponding to the mapped two-dimensional area of the workpiece into final pieces or slices. For each such simulated final piece or slice, a determination is made regarding the extent to which each final piece or slice exhibits the designated physical characteristics previously designated for the final pieces or slices. This information is used to achieve an overall rating of the selected portion of the workpiece to be harvested based on the extent to which each of the simulated final piece or slice achieves or possesses the designated desired physical characteristics of the final pieces/slices.

The foregoing process is iteratively repeated wherein a further two-dimensional area is mapped on the workpiece, and simulated final pieces or slices are analyzed to determine if the designated physical characteristics of the final pieces/slices are met. This iterative process is continued until an optimum two-dimensional area and location of the workpiece is identified. Thereafter, the workpiece is trimmed into such identified optimum two-dimensional area. Next, thereafter the trimmed workpiece can be sliced by a high speed slicing machine located adjacent the cutting station 16 or at a different location.

In FIG. 3, the workpiece WP depicted between the scanner 14 and the cutting station 16 represents the results of analyzing the workpiece to achieve an optimum configuration of a trimmed workpiece bearing in mind a desire for maximizing the portion of the workpiece that is harvested as well as achieving a desired quantity level for the resulting final pieces/slices that are cut from the workpiece.

Describing system 10 in more detail, the conveyor 12 carries the workpiece WP beneath a scanning station 14 and then beneath a cutting station 16. The conveyor 12 includes a powered belt 22 that trains around end rollers, such as roller 24 illustrated in FIG. 3.

Although a single belt 22 is shown, the conveyor system 12 may be composed of more than one belt, for instance, a flat, solid belt that supports the workpiece during scanning Such belts are typically non-metallic. The workpiece can be transferred from the first belt to a second belt, which supports the workpiece during the trimming process at station 16. If a waterjet cutter 26 is used, it is advantageous to utilize an open mesh metallic belt to allow the waterjet to pass downwardly thereto and also so that the belt is of sufficient structural integrity to withstand the impact thereon of the waterjet. Such metallic open mesh belts are articles of commerce.

The scanning system 14 may be a variety of different types, including a video camera (not shown) to view a workpiece WP illuminated by one or more light sources 25. Light from the light source 25 is extended across the moving conveyor belt 22 to define a sharp shadow or light stripe line, with the area forwardly of the transverse beam being dark. When no workpiece WP is being carried by the conveyor 12, the shadow line/light stripe forms a straight line across the conveyor belt. However, when a workpiece WP passes across the shadow line/light stripe, the upper, irregular surface of the workpiece produces a corresponding irregular shadow line/light stripe as viewed by a video camera directed diagonally downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe. The length of the workpiece is determined by the distance of the belt travel that shadow line/light stripes are created by the workpiece. In this regard, an encoder 30 is integrated into the conveyor 12, with the encoder generating pulses at fixed distance/time intervals corresponding to the forward movement of the conveyor.

In lieu of a video camera, the scanning station may instead utilize an x-ray apparatus (not shown) for determining the physical characteristics of the workpiece, including its shape, mass, and weight. X-rays may be passed through the object in the direction of an x-ray detector (not shown). Such x-rays are attenuated by the workpiece in proportion to the mass thereof. The x-ray detector is capable of measuring the intensity of the x-rays received thereby, after passing through the workpiece. This information is utilized to determine physical parameters pertaining to the size and/or shape of the workpiece, including for example, the length, width, aspect ratio, thickness, thickness profile, contour, outer contour configuration, perimeter, outer perimeter configuration, outer perimeter size and/or shape, volume and/or weight, as well as other aspects of the physical parameters of the workpiece. With respect to the outer perimeter configuration of the workpiece WP, the X-ray detector system can determine locations along the outer perimeter of the workpiece based on an X-Y coordinate system or other coordinate system. An example of such an x-ray scanning device is disclosed in U.S. Pat. No. 5,585,603, incorporated by reference herein.

The foregoing scanning systems are known in the art and, thus, are not novel per se. However, the use of these scanning systems in conjunction with the other aspects of the described embodiments is believed to be new.

The data and information measured/gathered by the scanning device(s) is transmitted to computer or processor 20, which records the location of the workpiece on the conveyor 12 as well as the shape, size, outer perimeter, outer contours, area, and other physical parameters or characteristics of the workpiece WP, as well as the location and orientation of the workpiece on the conveyor. Processor 20 can be used to determine and record these and other parameters/characteristics with respect to the workpiece being carried on the conveyor 12. The processor also determines designated parameters/characteristics of the simulated portions/slices cut from the workpiece WP.

In addition to the processor, the processing system 18 includes an interface 32 for receiving signals and information from scanning station 14. A memory unit 34 is provided for storing information regarding the system 10. A keyboard or other input device 36 is provided to enable an operator to communicate with the processor 20. Also, a display or other output device 38 is provided to convey information from the processor to the operator, including the functioning of the processing system 18.

The processing system also includes a controller 40, which may be in the form of a programmable logic controller or other type of controller, for controlling the operation of the system 10, including the conveyor 12, the scanning station 14, and the cutter station 16. The processing system 18 can be connected to a network 42. Also, rather than employing a local processor 20, a network computing system can be used for this purpose.

Various types of cutting devices may utilize the cutting station 16 to trim the workpiece WP into a two-dimensional shape as viewed from the top of the workpiece. FIG. 3 shows the workpiece as trimmed into a rectangular shape wherein the workpiece is a pork belly. As such, it is desirable that a rectangular workpiece results from the trimming process so that the pork belly may be sliced across the width of the rectangular shape into bacon slices. However, for other types of workpieces, other shapes may be desirable in addition to or lieu of the rectangular shape illustrated.

One type of cutter that may be used at cutting station 16 is a high pressure waterjet cutter 26. Such cutters are disclosed in U.S. Pat. Nos. 4,875,254, 5,365,186, and 5,868,056, all incorporated herein by reference. As schematically shown in FIG. 3, the waterjet cutter 26 includes a nozzle that may be moved relative to the conveyor 12 both longitudinally of the conveyor and laterally of the conveyor, as well as vertically relative to the conveyor surface. This enables the waterjet cutter 26 to trim the workpiece so as to achieve a desired final shape for the workpiece prior to portioning the workpiece into final portions including cutting the workpiece into transverse slices, for example, when cutting bacon slices from a pork belly.

Figure 7:
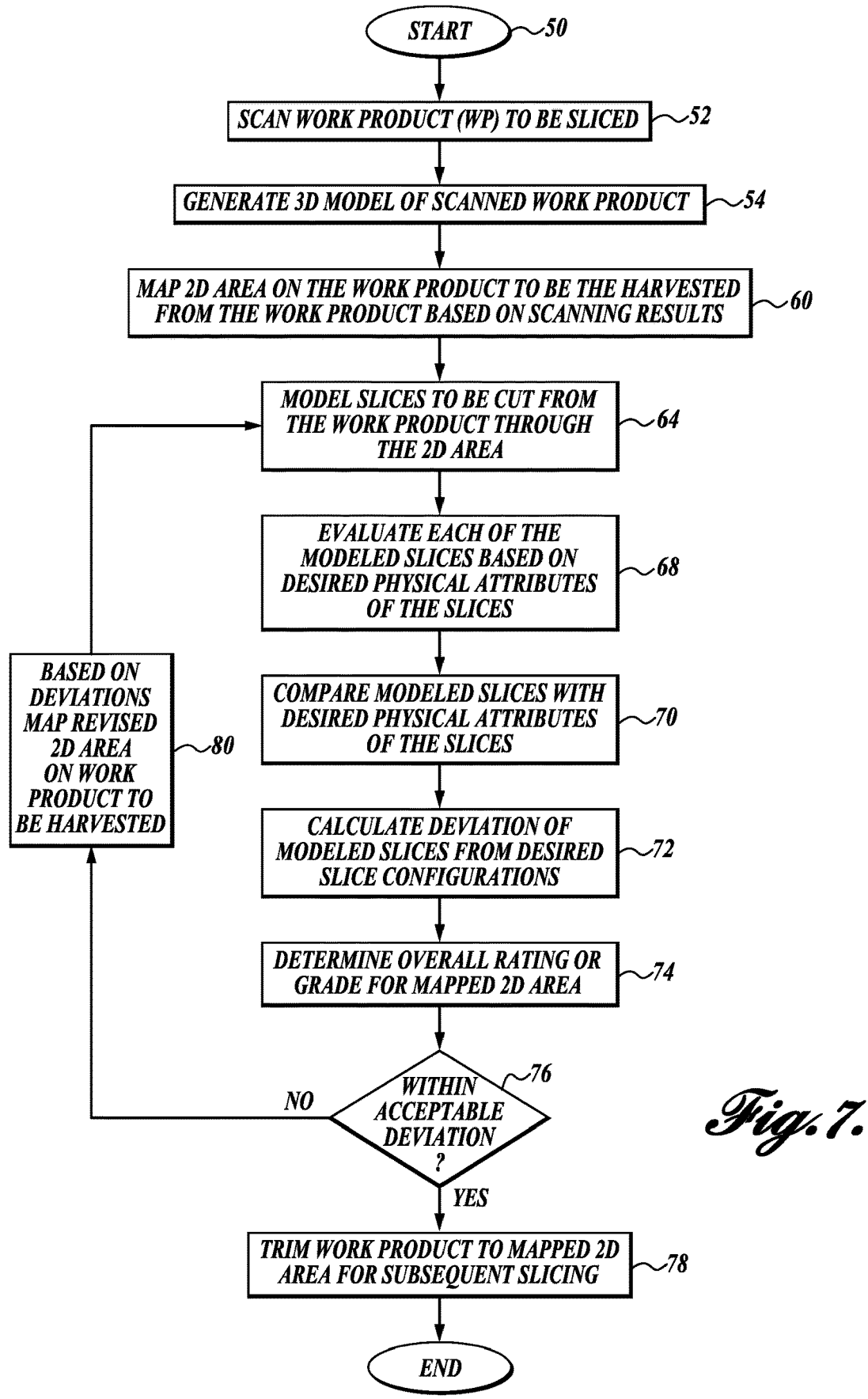
FIG. 7 is a flow diagram illustrating a process that may be carried out using the system of the present disclosure.

FIG. 7 is a flow diagram illustrating an overall process using the system 10 of the present disclosure. The method starts at step 50 and includes step 52 of scanning the workpiece WP which is to be trimmed into an optimal shape to achieve a high level yield of slices from the workpiece of a desired quality. In the scanning step, information or data (in electronic form) concerning the physical parameters/characteristics of the work products may be obtained, including with respect to the size, shape and location of the work products. Such characteristics or parameters may include, for example, the length, width, aspect ratio, thickness, thickness profile, contour, outer or exterior contour profile, perimeter, outer perimeter configuration, outer perimeter size, outer perimeter shape, volume and/or weight of the workpiece, as well as discontinuities in the workpiece, including depressions or concavities, contours in the outer shape or surface of the workpiece.

As noted above, the system and method of the present disclosure may be utilized to harvest bacon slices from pork bellies. Pork bellies typically include a notch or a depression at one end of the pork belly, which is a physical characteristic of pork bellies. Often times the depression or notch is sufficiently deep that attempts are not made to harvest bacon slices from this location of the pork belly. The scanning step may be utilized to locate the pork belly notch.

Figure 4:
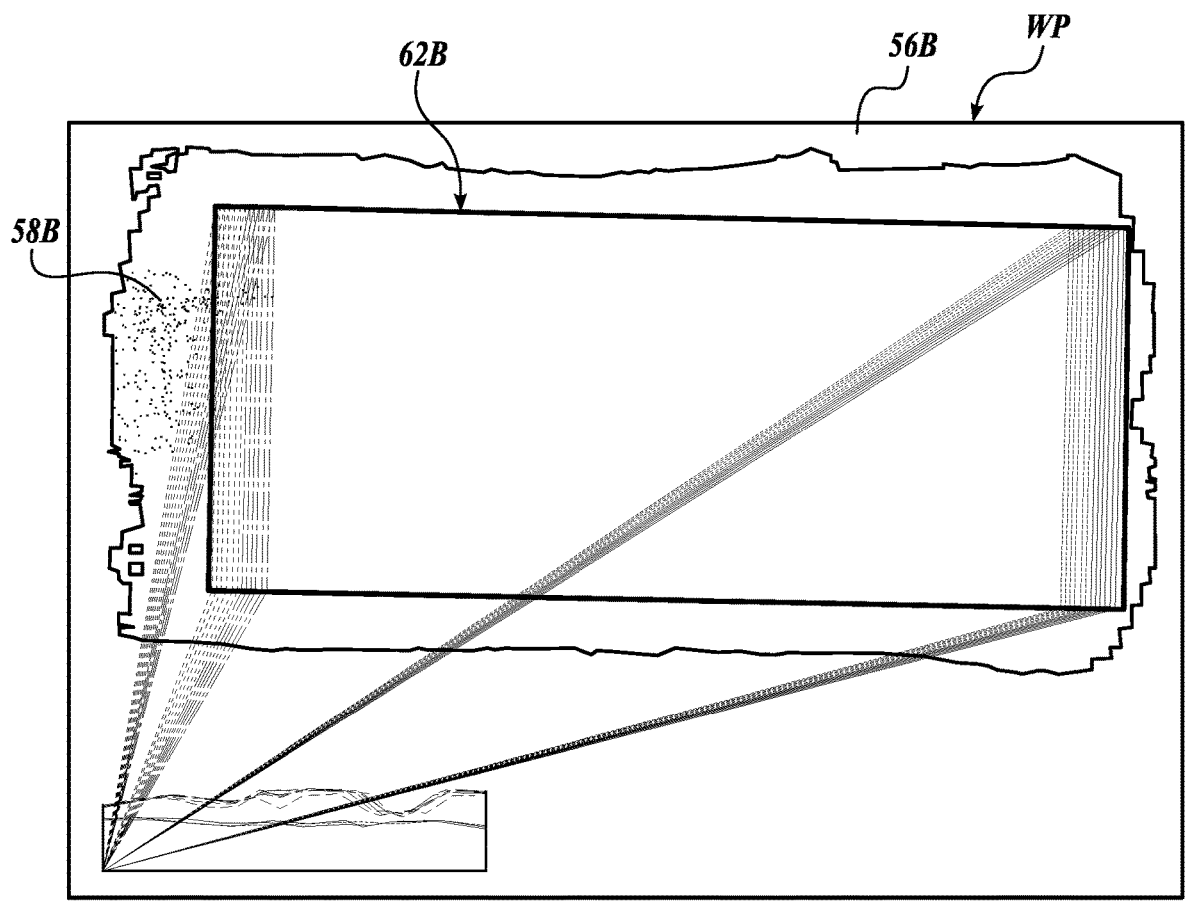
FIG. 4 is a schematic view showing the portion of the workpiece that may be harvested using the system and method of the present disclosure.
Figure 5:
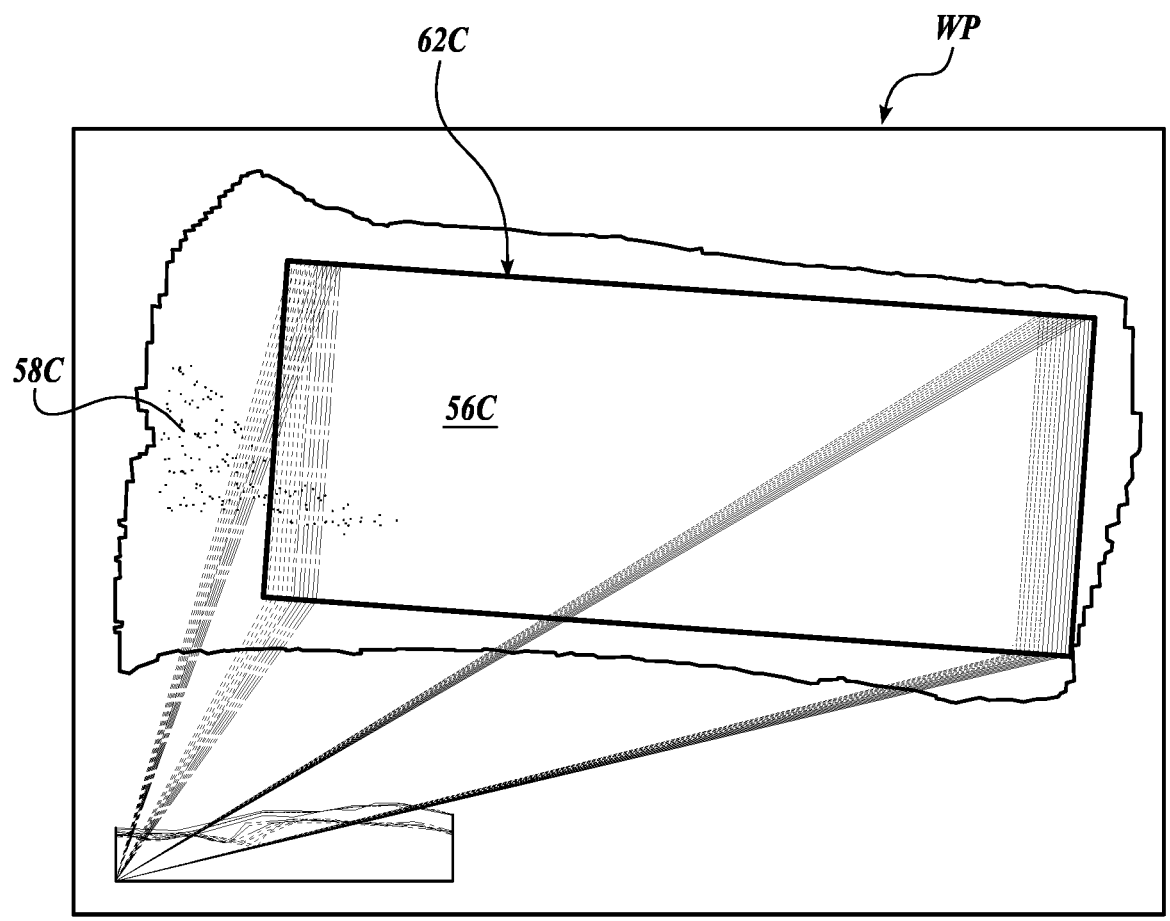
FIG. 5 is a view similar to FIG. 4, but with a different workpiece.

The electronic data or information from the scanning step is transmitted to the processor 20 which utilizes such information to generate a three-dimensional model of the workpiece WP. Such three-dimensional models are illustrated in FIGS. 3, 4 and 5 as models 56a, 56b and 56c. The generated models 56a, 56b and 56c include the telltale notch 58a, 58b and 58c, respectively, at the left margins of the generated models.

Next, in step 60, a two-dimensional area 62 is mapped onto the top surface of the work product WP to represent the portion of the work product to be harvested as portions or slices. The mapped initial two-dimensional area may be somewhat smaller than the overall size of the work product. Nonetheless, at step 64 the simulated portions or slices are cut from the mapped two-dimensional area of the work product, and then each of the portions/slices is analyzed, as discussed below regarding steps 68, 70 and 72, to determine the extent of which the portions or slices achieve desired characteristics or attributes for the final portions/slices. Such analysis is carried out, as discussed below, by an optimization program or programs.

The process shown in FIG. 7 is iterative in the sense that an initial two-dimensional area 62 on the work product is mapped and then the optimization program will enlarge the two-dimensional area iteratively and for each subsequent two-dimensional area, the optimization program will analyze each portion or slice cut (by simulation) from the workpiece for physical characteristics, including the desired attributes. The optimization program is capable of moving the mapped area lengthwise of the modeled workpiece, laterally of the modeled workpiece, as well as capable of rotating the mapped area on the shape of the workpiece as viewed from above the workpiece. FIGS. 3, 4 and 5 illustrate two-dimensional areas 62 mapped on the workpiece toward the end of the iterative process in that such two-dimensional areas occupy substantially the entire area of the workpiece. Typically, at the beginning of the iterative process, the two-dimensional area 62 would occupy a smaller portion of the total area of the workpiece than as illustrated in FIGS. 3, 4 and 5.

As noted above, once a two-dimensional area 62 has been mapped onto the workpiece WP, at step 64, simulated cuts are made to the workpiece to portion the workpiece or slice the workpiece. As one example, noted above, the present system and method can be utilized to trim pork bellies in preparation for cutting the pork bellies into bacon slices. FIG. 3 shows simulated cuts 66 made across the workpiece. For other types of workpieces, the cuts may not be across the workpiece as shown in FIG. 3, but at a different angle with respect to the workpiece, or the workpiece may be cut into shapes rather than into slices as shown in FIG. 3.

Next, in step 68, the simulated end portions or slices is analyzed or evaluated based on desired physical characteristics or attributes of the slices. Numerous physical characteristics or attributes of the portions or slices can be evaluated using an optimization program. Such characteristics or attributes can include, for example, one or more of the thickness of the simulated final piece or slice, the length of the simulated final piece or slice, the height range of the simulated final piece or slice along the length thereof, the heights at the ends of the final piece or slice, the height variation or range along the length of the simulated final piece or slice, the minimum height along the length of the simulated final piece or slice, the flatness of the top and bottom surfaces of the simulated final piece or slice, the extent of concavity of the top and bottom surfaces of the simulated final piece or slice, the area of the concavity of the top/bottom surfaces of the final piece or slice, the depth of the concavity of the top/bottom surface of the final piece or slice, the aspect ratio of the concavity of the top/bottom surface of the simulated final piece or slice, the taper of the height of the simulated final piece or slice along the length thereof, the area of the simulated final piece or slice which is defined by the length and height of the simulated final piece or slice. Such height corresponds to the thickness of the three-dimensional workpiece WP.

Other characteristics or attributes include the range of the taper of the simulated final piece or slice corresponding to the slope or taper of the top surface of the final piece or slice. A further attribute or physical characteristic is the over edge area, which corresponds to a situation in which the modeled two-dimensional area extends beyond the perimeter of the workpiece. This is an undesired attribute or physical characteristic which is viewed as a reduction of the quality of the final piece or slice. A further attribute or physical characteristic is the roughness or unevenness of the top and bottom surfaces of the final piece or slice.

Another attribute or characteristic is the area of the mapped two-dimensional area on the workpiece relative to the total two-dimensional area of the workpiece. It is desirable to utilize as much of the total two-dimensional area of the workpiece as possible while maintaining a desired quality level, which is a measure of the extent to which each of the final pieces or slices achieve the set point or set point range established for each of the attributes or physical characteristics analyzed for each final workpiece or slice. In step 68, each of the simulated end pieces or slices can be analyzed.

Alternatively, the simulated end pieces or slices can be analyzed at a selected frequency, for example, every other slice, every third slice, or other frequency of slices.

In step 70, the designated physical attributes or characteristics of the analyzed final pieces or slices is compared with a desired value, set point or range for each of the designated attributes or characteristics. This analysis is carried out for the analyzed simulated final pieces or slices from the workpiece. This analysis can be performed using an optimization function or program which determines the deviation from the desired or set point attributes or characteristics determined for the modeled final pieces or slices, step 72. This analysis for portions/slices is used to grade or rate the overall modeled portion 62 of the workpiece, this is the portion of the workpiece to be harvested from the workpiece based on the mapped two-dimensional area of the workpiece, step 74. An overall rating or grade for the workpiece can be established and once such grade or rating is achieved, the iterative analysis process discussed above is terminated and then the workpiece is trimmed accordingly at step 78. However, if the set point or set point range for the overall grade or rating is not achieved, then in steps 76 and 80 a further iteration of the process beginning at step 64 is repeated.

As an alternative, at each iteration of the foregoing process, the overall rating or grade of the "harvested" workpiece is determined. As can be appreciated, as the two-dimensional area of the workpiece increases, although the harvest quantity of the workpiece increases, at some point the quality of the final pieces or slices will decrease due to not meeting one or more of the designated physical attributes or characteristics of each of the final pieces/slices. For example, as the two-dimensional area expands it may reach the notch of the workpiece if the workpiece is a pork belly, or to the perimeter of the workpiece, which may be thinner or less uniform toward or adjacent the outer perimeter of the workpiece, as shown in FIGS. 3, 4 and 5.

Once the quality of the final pieces or slices decreases below an established limit or set point, then the iteration process is terminated and the area and location corresponding to the last acceptable iteration is used as the mapped area and location on the workpiece. The workpiece is then trimmed to this mapped area and location.

FIGS. 4 and 5 in the lower left hand corner of the frame illustrate the upper contours of simulated slices cut from the workpiece. As illustrated, along portions of the margins of the workpiece the upper surfaces of the slices vary significantly in height or contour (The height of a slice corresponds to the thickness of the workpiece). Such variation typically is viewed as less desirable than if the upper surface were more uniform in height/contour.

As noted above, the optimizer iteratively alters the size and/or location of the two-dimensional area relative to the workpiece to seek an optimal two-dimensional harvest area on the workpiece. The optimizer is provided with 2 steps so that the change in the two dimensional area is not necessarily uniform from each iteration to the next. Rather, with the 2 steps, the optimizer has a sense for how aggressively to change the two-dimensional area in size and location in the process of seeking an optimum solution. In this manner, the number of iterations necessary to reach the optimum solution is reduced.

The optimization process undertaken by the processor 20 can employ a value function (or its negative/opposite—a cost function) to rank each of the iterations of the potential two-dimensional areas 62 of the work product to be harvested, as discussed above. In this regard, for the cut final portions or slices, each or selected designated physical attribute or characteristic is compared to an acceptable value range for such attribute or characteristic. For such attributes or characteristics, an acceptable value range is determined rather than just a single acceptable value. The cost function can be defined that has a value of 0 at the center of each range of each physical attribute or characteristic, with an increasing cost as the simulated values of the attribute or characteristic deviates from the center of the specified range.

Further, a weighing factor can be applied to the cost for the physical attributes or characteristics. Thereafter, the weighted costs of the designated attributes or characteristics are combined, such as by addition, to give a total cost. This analysis is carried out for the final pieces or slices simulated from the mapped selected area of the workpiece. As such, the total cost of the simulated final pieces or slices are combined to arrive at a total cost for the entire workpiece.

It will be understood that the term "cost" is used herein to refer to the negative or opposite of the term "value." It is possible to carry out the foregoing analysis from the viewpoint of the value achieved by the simulated final pieces or slices. Thus, the terms "cost" and "value" are related in a sense that, with respect to a particular physical attribute or characteristic, an increase in the "cost" corresponds to a decrease in the "value."

The cost function definition can take almost any form, including a "one-sided" definition where an attribute or characteristic can never be above or below a threshold, and the target (zero cost) value is something other than in the middle of a range. An example of this is that the end of the final piece or slice should not extend beyond the edge of the actual workpiece.

Other cost functions that can be used, including:
1) the cost increases with deviation from the range midpoint, and continues increasing for characteristic values beyond the range;
2) the cost increases from a deviation from the range midpoint, with "hard" limits (for example, a large step-function increase) at the range limits;
3) there is no cost associated with values within the range, with "hard" limits at the range limits.

The "total cost" numbers can be analyzed using a multi-dimensional optimization technique, such as the "Gradient Descent" minimization algorithm, to expeditiously find an optimal size and location for the trimmed workpiece. Within a limited number of iterations of selected areas overlaid on the workpiece, it is possible to find an optimal solution without having to consider all of the perhaps thousands of potential sizes and positions of the area superimposed on the workpiece. Examples of non-linear algorithms similar to Gradient Descent include the Gauss-Newton method, the BFGS method, and the Levenberg-Marquardt method. Other algorithms or analysis methods may be utilized in this regard, including, for example, the Nieder-Mead method, differential evolution methods, genetic algorithms, and particle form optimization.

The method and system of the present disclosure may be operated with a plurality of optimization function analysis running at the same time on the same workpiece to simplify achieving the desired designated attributes and characteristics of the final pieces or slices harvested from the workpiece. For example, one analysis may be seeking to establish the size of the two dimensional area corresponding to the workpiece to be harvested. A second analysis may be seeking to position the two-dimensional area longitudinally, laterally, and/or rotationally on the workpiece to optimize the harvest versus the value of the final pieces or slices harvested from the workpiece. These two analyses may be applied to the workpiece at the same time using different optimization functions.

Figure 6:
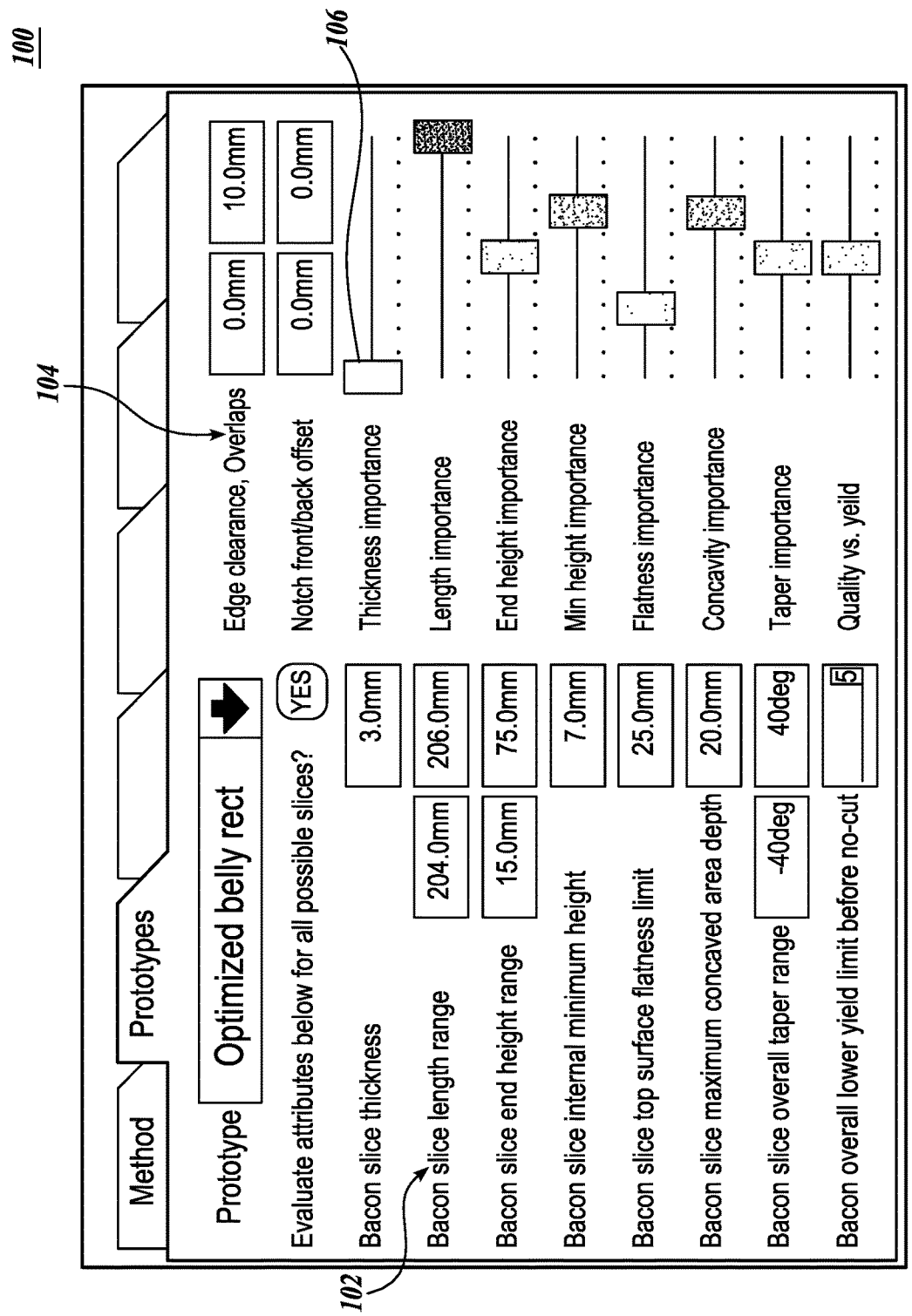
FIG. 6 illustrates a graphical user interface that may be employed with the systems and methods of the present disclosure.

FIG. 6 illustrates a portion of a graphical user interface (GUI) 100 that may be used in conjunction with the present system and method. In the GUI of FIG. 6, a column of attributes or characteristics 102 extends down the left side of the GUI (bacon slice thickness, bacon slice length range, bacon size end height range, bacon slice internal minimum height, bacon slice top surface flatness limit, bacon slice maximum concave area depth, bacon slice overall taper range, bacon overall lower yield limit before no-cut), or attributes or characteristics that contribute to the cost function described above. The midpoint or desired value of the attribute/characteristic can be entered in the display areas to the right of the designated attribute/characteristic, such as the desired value of the bacon slice thickness. In other situations, end values for an acceptable value range for the characteristic may be entered; for example, the bacon slice length range of 204 mm to 206 mm.

It will be appreciated that additional attributes/characteristics are located in the right-hand column 104 of the GUI 100. These additional attributes/characteristics include the edge clearance or overlap of the ends of the final pieces/slices relative to the edge of the workpiece as well as the notch offset to the selected harvest area of the workpiece.

The GUI 100 also includes the ability to set the importance of particular attributes or characteristics by adjusting the weighting coefficients in the optimization function for individual attributes or characteristics. This is carried out by positioning of slider buttons or knobs 106 laterally along a length of a slide scale. For example, as shown in FIG. 6, the knob 106 for the thickness attribute or characteristic of the bacon slice is at the left margin, indicating relatively low importance whereas the knob for the length range of the bacon slice is at the far right, indicating that this attribute or factor is of greater importance than the thickness of the bacon slice. The attribute or characteristic of the heights of the bacon slice at the ends is set to be of nominal or "standard" importance with the slider being positioned at the middle of the sliding scale.

It will be appreciated that the user interface 6 enables the operator to conveniently specify the designated attributes or characteristics of the final pieces or slices harvested from the workpiece, and that the settings can be changed quite often, for example, to adjust to the physical attributes or types of the workpieces being processed.

While illustrative embodiments have been illustrated and described, it will be appreciated that various changes can be made therein without departing from the spirit and scope of the invention. For example, attributes or characteristics in addition to or in lieu of those described herein can be employed.

Further, although the forgoing description has focused on attributes or characteristics of the top surface of the workpiece (e.g., pork belly), the analysis and evaluation of the workpiece can also or alternatively focus on the bottom surface of the workpiece. Scanning techniques, including optical and x-ray scanning, can be used to analyze the bottom surface of a workpiece to ascertain voids, undercuts or other anomalies. As such the final pieces or slices simulated from the workpiece can take into consideration the condition of the bottom surface of the workpiece.

Also, although the present disclosure has been in the context of pork bellies, the present disclosure can be applied to other meat primals and subprimals, as well as to non-meat workpieces, whether composed of food or otherwise.

While illustrative embodiments have been illustrated and described, it will be appreciated that various changes can be made therein without departing from the spirit and scope of the invention.

The embodiments of the invention in which an exclusive property or privilege is claimed are defined as follows:

1. A control system for controlling a system for trimming a stream of three-dimensional workpieces while being conveyed on a conveyor system for dividing the trimmed workpieces into multiple final pieces based on designated physical characteristics of the final pieces, the conveyor system transporting the workpieces past a scanner apparatus for scanning the workpiece to obtain electronic data regarding the physical characteristics of the workpieces used by a processor to generate three-dimensional models of the workpieces and past a cutter for trimming the workpieces, the control system comprising:
    mapping an initial two-dimensional area on the workpiece to select a portion of the workpiece to be harvested from the workpiece based on the generated three-dimensional model of the workpiece;
    simulating the dividing of the workpiece corresponding to the mapped two-dimensional area of the workpiece into final pieces;
    determining for the simulated final pieces a variance from the designated physical characteristics of the final pieces;
    controlling the cutter for trimming the mapped two-dimensional area of the workpiece if the-variance of the final pieces to be harvested is within a predetermined set point.

2. The control system according to claim 1, further comprising:
    rating the overall selected portion of the workpiece to be harvested based on the extent to which the simulated final pieces possess the designated physical characteristics of the final pieces; and
    controlling the cutter for trimming the mapped two-dimensional area of the workpiece if the rating of the of the final pieces to be harvested is within a predetermined set point.

3. The control system according to claim 1, further comprising mapping the two-dimensional area onto the top surface of the scanned workpiece.

4. The control system according to claim 3, further comprising adjusting the two-dimensional area to the shape of the workpiece when viewed from the top of the workpiece.

5. The control system according to claim 4, further comprising mapping the one or more of the length, width and angulation about a vertical axis of the two-dimensional area on the workpiece based on the shape of the workpiece when viewed from the top of the workpiece.

6. The control system according to claim 1, wherein the two-dimensional area mapped on the workpiece by the control system is generally rectangular in shape.

7. The control system according to claim 1, wherein the designated physical characteristics are selected from the group consisting of: the thickness of the simulated final piece; the length of the simulated final piece; the height range of the simulated final piece; the heights at the ends of the simulated final piece; the height range along the length of the simulated final piece; the minimum height along the length of the simulated final piece; the flatness of the top and/or bottom surface of the simulated final piece; the extent of concavity of the top and/or bottom surface of the simulated final piece; the area of the concavity of the top and/or bottom surface of the final piece; the depth of the concavity of the top and/or bottom surface of the final piece; the aspect ratio of the concavity of the top and/or bottom surface of the simulated final piece; the taper of the height of the simulated final piece along the length simulated final piece; the roughness of the top and/or bottom surface of the simulated final piece; the area of the simulated final piece defined by the length and height of the simulated final piece; the range of taper of the simulated final piece; the area of the mapped two-dimensional area on the workpiece relative to the total two-dimensional area of the workpiece.

8. The control system according to claim 1, further comprising rating the overall selected portion of the workpiece to be harvested according to an optimization function as applied to the designated physical characteristics of the final pieces to be divided from the selected portion of the final piece.

9. The control system according to claim 2, further comprising rating the selected portion of the workpiece to be harvested from the workpiece based on the deviation of one or more of the designated physical characteristics of the final piece from an ideal physical characteristic value or level.

10. The control system according to claim 2, further comprising applying a rating factor to one or more of the designated physical characteristics.

11. The control system according to claim 10, further comprising automatically adjusting the rating factor based on one or more algorithms to maximize the optimization rating of the one or more designated physical characteristics.

12. The control system according to claim 1, further comprising applying one or more optimization functions to one or more of the designated physical characteristics of the final pieces.

13. The control system according to claim 1, further comprising applying a plurality of optimization functions to one or more of the designated physical characteristics.

14. The control system according to claim 1, further comprising applying a weighted value to one or more of the designated physical characteristics with a user interface.

15. The control system according to claim 14, wherein the user interface enables entry or alteration of one or more designated physical characteristics.

16. The control system according to claim 2, further comprising rating the selected portion of the workpiece to be harvested from the workpiece according to one of:
(a) a cost function applied to one or more of the designated physical characteristics with a cost applied to the one or more designated physical characteristics increasing as the one or more designated physical characteristics deviates from an ideal characteristic value or level; and
(b) a value function is applied to one or more of the designated physical characteristics, with a value applied to the one or more designated physical characteristics decreasing as the one or more designated physical characteristic deviates from an ideal characteristic value or level.

17. The control system of claim 1, further comprising iteratively mapping two-dimensional areas and locations of the pork belly to be sliced, simulating the slicing of the pork belly from the selected two-dimensional area and location, determining for each of the simulated slices the variance from the desired physical attributes of the slices and rating the overall selected portion of the pork belly corresponding to the mapped two-dimensional area and location based on the extent to which of the simulated slices possesses the desired physical attributes of the slices, until an optimum two-dimensional area and location of the workpiece is obtained.

18. A method for trimming a three-dimensional workpiece that has been modeled in three dimensions for dividing the trimmed workpieces into multiple final pieces based on designated physical characteristics of the final pieces, comprising:
designating a plurality of physical characteristics for the final pieces;
mapping an initial two-dimensional area on the workpiece to select a portion of the workpiece to be harvested from the workpiece based on the three-dimensional model of the workpiece;
simulating the dividing of the workpiece corresponding to the mapped two-dimensional area of the workpiece into final pieces;
determining for the simulated final pieces a variance from the designated physical characteristics of the final pieces;
if the variance of the simulated final pieces from the designated physical characteristics for the final pieces is within a predetermined set point, trimming the workpiece into final pieces from the mapped two-dimensional area.

19. A non-transitory computer-readable medium including computer-executable instructions which, when loaded onto a computer, perform a method on a physically modeled workpiece, comprising:
designating a plurality of physical characteristics for final pieces to be divided from a workpiece after the workpiece has been trimmed;
mapping an initial two-dimensional area on the workpiece to select a portion of the workpiece to be harvested from the workpiece based on the modeled workpiece;
simulating the dividing of the workpiece corresponding to the mapped two-dimensional area of the workpiece into final pieces;
determining for the simulated final pieces a variance from the designated physical characteristics of the final pieces;
if the variance of the simulated final pieces from the designated physical characteristics is within a predetermined set point, trimming the mapped two-dimensional area of the workpiece into final pieces.

* * * * *